Dec. 4, 1934.  R. STAR  1,982,970
TANK GAUGE
Filed Aug. 11, 1933
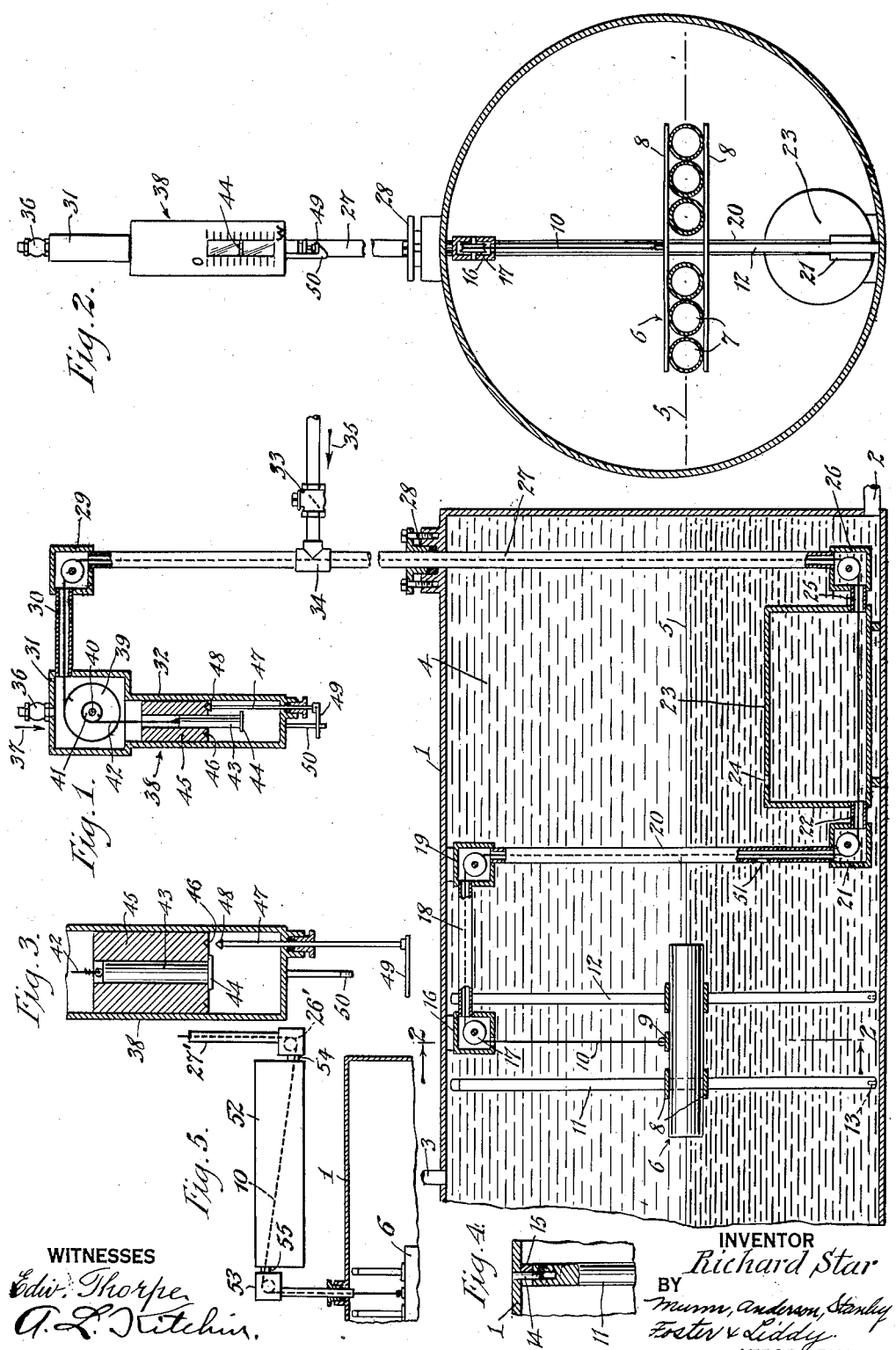
INVENTOR
*Richard Star*
BY
*Munn, Anderson, Stanley, Foster & Liddy*
ATTORNEYS
WITNESSES
*Edw. Thorpe*
*G. L. Kitchin*

Patented Dec. 4, 1934

1,982,970

UNITED STATES PATENT OFFICE 1,982,970

TANK GAUGE

Richard Star, Brooklyn, N. Y.; Frank Kruth administrator of said Richard Star, deceased Application August 11, 1933, Serial No. 684,735

7 Claims. (Cl. 73—82)

This invention relates to tank gauges and particularly to the type known as cleavage line and full head gauges, the object being to provide an improved construction which functions to tell at all times the amount of gasoline or oil in a tank, as well as the amount of water therein.

Another object of the present invention is to provide an improved tank gauge using a float as an actuator and with the parts so arranged that an indicator will cause the float at one time to float only on the water and at another time to float only on the oil or gasoline.

A further object of the invention is to provide a tank gauge for indicating the level of one of two liquids in a tank, the structure being such that part of the mechanism is arranged within the tank and part exteriorly thereof, the part arranged exteriorly of the tank including an indicating structure, while the part arranged interiorly of the tank includes a float for actuating the indicator and a liquid trap for preventing oil from passing to the indicator.

In the accompanying drawing—

Figure 1 is a longitudinal vertical sectional view through part of a tank with an embodiment of the invention applied thereto, said embodiment being shown partly in section;

Figure 2 is a sectional view through Figure 1, approximately on the line 2—2;

Figure 3 is an enlarged vertical sectional view through part of the gauge illustrated in Figure 1, the same being on an enlarged scale and showing the parts in a different position;

Figure 4 is an enlarged vertical sectional view through one of the guiding posts shown in Figure 1, and illustrating how the same is held in place;

Figure 5 is a fragmentary view of the tank shown in Figure 1 with a modified form of trap associated therewith.

Referring to the accompanying drawing by numerals, 1 indicates a tank of any desired kind as, for instance, a tubular tank used on board a ship. In ships both large and small it has become customary when carrying oil, kerosene, gasoline or similar combustible fuels, to force water into the tank as the fuel is removed therefrom. This is to prevent splashing of the oil, particularly where the oil is very light as, for instance, kerosene or gasoline. Where oil splashes considerably gases are formed and the danger of explosion is increased. To avoid this danger it is customary in war vessels and other vessels to force the water in at the bottom of the tank as the fuel is forced from the top of the tank. By this method the tank is always filled with liquid of some kind. This practice has resulted in some difficulties in measuring or ascertaining the exact quantity of fuel in the tank at any time. The invention of the present application presents a gauge for indicating the amount of fuel and also the amount of water in the tank.

The tank 1 is provided with a water inlet 2 near the bottom, while at the top a fuel outlet 3 is provided. Ordinarily water enters the inlet 2 under some pressure so that all that is necessary to draw off the fuel, namely, the oil 4, is to open the outlet 3 and allow the fuel to run out as the water is forced in. Outlet 3, of course, is extended to the desired point of utilization and one or more valves are arranged in this outlet as desired. By opening these valves the oil is allowed to escape and, consequently, the water line 5 will move upwardly.

Arranged within tank 1 is a float 6 which is shown as consisting of a number of metal tubes 7 welded to the various bars 8. A central bar 9 is also welded to the various containers or closed tubes 7 so that the cable 10 may be connected therewith and may be actuated by the float. Each of the bars 8 is provided with an aperture for accommodating the respective posts 11 and 12, which posts are carried by the tank 1 and act as guides for guiding the float in an upward or downward direction. Each of these posts is provided with a bore at each end, the lower end fitting over the pin 13 which is carried by tank 1, while the upper end accommodates part of the pin 14 (Fig. 4). The remaining part accommodates a split ring 15 which may be snapped into place at the desired time. When it is desired to mount one of the posts 11 or 12 into place, the upper end is slipped over pin 14 and moved upwardly until the lower end can be slipped over pin 13, whereupon the post is lowered but the upper end of the post will not become disconnected from pin 14 as this pin is longer than pin 13. To prevent any loose motion of the post a clip or ring 15 is snapped into place as shown in Fig. 4, and the post is then in operative position.

Connected to tank 1 in any desired manner, preferably between posts 11 and 12 near the upper end thereof, is a housing or hollow block 16 which carries a pulley 17 over which the cable 10 passes, said cable also passing through pipe 18 which is connected to housing 16 and to a similar housing 19. Housing 19 has a pipe 20 connected therewith which extends downwardly and is connected with housing 21 at or near the bottom of the tank. A pipe 22 connects this housing 21 to a trap 23 which may be a round, square or other shaped container having an opening 24 in the upper wall. A pipe 25 connects the lower part of trap 23 with housing 26 which housing carries a pipe 27 extending upwardly and through a packing box 28 to a desired point above tank 1 where it is connected to a housing 29 carrying pipe 30, which in turn is connected to a comparatively large housing 31, which housing has a hollow tubular extension 32. It will be understood that in housings 19, 21, 26 and 29 are arranged pulleys preferably identical with pulley 17 so that the cable 10 may be readily passed over these various pulleys and through the lower part of trap 23 freely. A check valve 33 is connected to pipe 27 at 34 so that water or other liquid may be forced into pipe 27 but not drawn therefrom, the valve functioning only as indicated by the arrow 35. Likewise a check valve 36 is connected to the top of housing 21 and opens as indicated by the arrow 37 whereby liquid may be inserted to but not withdrawn therefrom. The cable 10 passing through pipe 30 enters what may be termed an indicator 38 and is rigidly secured to a pulley or drum 39 rotatably mounted on shaft 40. A small drum 41 is rigidly secured to drum 39 and has one end of the auxiliary cable 42 connected therewith, whereby as drum 39 unwinds drum 41 will wind and will raise the auxiliary cable 42 and the primary weight 43. This weight has a flange or head 44 at the lower end which acts in the double capacity of an indicating bar, as illustrated in Fig. 2, and as a supporting member for the auxiliary weight 45, as shown in Fig. 3.

Weight 45 is provided with an annular groove 46 and the end of rod 47 is positioned to fit into this groove. This groove may be V-shaped in cross section as shown in the drawing, and if so the head 48 will be of corresponding shape. When weight 45 is not being used it is supported by the rod 47 as shown in Fig. 1, but when it is desired to use this weight the rod 47 is lowered and the weight is lowered to rest on the flange 44, whereby the weight 45 will be added to the primary weight 43 and thereby exert a greater pull on the cable and associated parts. Rod 47 has an actuating and holding handle 49 which is adapted to be swung around and passed over the hook 50 when the weight 45 is held in an inoperative position. Preferably the indicator 38 is filled with a mixture of water and glycerine so that the various parts just described will operate in this solution, while pipes 27 and 30 are usually filled with water as well as the trap 23 and pipe 20 up to the vent 51. As the water line 5 moves upwardly the water in pipe 20 will naturally move upwardly and any gasoline in this pipe and the housings 16 and 19 will be gradually forced out through the opening in housing 16.

Float 46 when counterbalanced by the weight 43 is such as to float properly on the water and will remain approximately half above and half below the water line 5. From this it will be seen that when weight 45 is raised the distance of the flange 44 from the top of the graduations marked "W" in Fig. 2, the level of the water in the tank is indicated. If the flange 44 was at the bottom of the graduations marked "W" in Fig. 2 it would indicate that the tank was completely filled with water.

On the other hand, if it is desired to learn if the tank is completely filled with gasoline, the rod 47 is lowered to the position shown in Fig. 3, whereupon the weight 43 will be carried by flange 44 and will give a further counterbalancing effect to float 6, so that float 6 will then float on the gasoline, oil or other fuel. If the tank is completely filled with gasoline the float 6 will be at its highest point under these circumstances in tank 1, and flange 44 will be at its lowest point on the scale marked "O" in Fig. 2. It will thus be seen that when tank 1 is filled with gasoline, or filled with water, the same readings will be had on the respective graduations "O" and "W". However, if when filling the tank with gasoline all the water is drawn off or leaks out and the tank is not completely filled with gasoline, float 6 will then rise to less than the highest point and, consequently, flange 44 will not move down to the bottom of the graduations "O" but will show a certain empty space.

It will be understood that in the construction set forth there are no stuffing boxes provided or similar devices through which anything may move and cause resistance and error in the gauge readings. The stuffing box 28 is fixed and stationary, as pipe 27 is clamped in position and the cable 10 moves freely back and forth in this pipe. When the tank is filled with oil the parts are usually adjusted so that the weight 45 will be held raised, whereby the float 6 will be on the bottom of the tank, thus indicating that the tank is filled with oil, gasoline or similar liquid. As water is forced into the tank by the use of the fuel, flange 44 acting as a pointer or indicator will accordingly rise, so that a fireman or other operator will readily observe this action and see the speed at which the fuel is being fed from the tank and also the amount of fuel left in the tank.

When the water is drawn out, the water in trap 23 remains so that oil cannot enter pipe 27. Instead of using an interior trap such as trap 23, an exterior trap such as trap 52, shown in Fig. 5, may be used. In trap 23 the pipes or nipples 22 and 25 are connected to the trap on the bottom, while trap 52 is associated with pulley housing 26' near the bottom of the trap, whereby the cable 10 may pass over the pulleys in the respective housings through the respective nipples 54 and 55 and through the trap 52 which is continually filled with water. By having the nipple 55 near the upper part none of the water can pass out of the trap in case tank 1 is completely emptied. It will be understood, however, that trap 52 is filled manually, preferably through the check valve 36. It will also be understood that pipe 27', shown in Fig. 5, is connected up in some way as pipe 27 and is associated with some kind of indicator as shown in Fig. 1, and designated 38. All the parts shown in Fig. 5 are identical to those shown in Fig. 1 except for the fact that the trap 52 is exterior of the tank and that the housings 26' and 53 and associated parts are slightly differently arranged for the reasons above set forth.

I claim:—

1. A cleavage line and full head tank gauge comprising a float, an indicating structure, and means actuated by the float for causing the indicating structure to function, said indicating structure including a pair of weights counterbalancing said float, and means for holding one weight out of functioning position, one of said weights causing said float to float on a given liquid, and both of said weights causing said float to float on a lighter liquid.

2. A tank gauge of the character described for indicating the level of one or two liquids in a tank, comprising a float adapted to be positioned in a tank, means for guiding said float in its upward and downward movement, a cable pulled by said float in one direction, a weight for pulling said cable in the opposite direction, said weight counterbalancing said float so that it will float on a certain liquid, a secondary weight, means for holding said secondary weight out of engagement with the first mentioned weight, said means being adjustable to a position to permit said secondary weight to be raised with the first mentioned weight whereby said float will float on the surface of a lighter fluid, and means coacting with the first mentioned weight for indicating the position of the float in said tank.

3. In a tank gauge of the character described, a float, a cable connected with said float and adapted to be pulled thereby, means including pulleys for guiding the cable to a given point, a drum connected to the end of said cable, a second drum connected to the first mentioned drum, an auxiliary cable wound on the second drum, a weight carried by said auxiliary cable acting to counterbalance to a certain extent said float so as to cause the float to float on water, an auxiliary weight, means for normally supporting the auxiliary weight above the first mentioned weight, a manually actuated member for releasing the auxiliary weight to allow it to rest on the first mentioned weight whereby said float will be counterbalanced sufficiently to cause the same to float on oil, and means coacting with the first mentioned weight to indicate the position of the float in a tank.

4. In a tank gauge for a tank adapted to contain water and oil, a float arranged in the tank, means for guiding the float in its upward and downward movement, a cable connected to said float, means including a tubular structure for guiding said cable to a high point in said tank, and then to a low point in said tank, and finally to a point above the tank exteriorly thereof, said tubular means including a water trap having openings in the upper part whereby when the water in the tank is removed and replaced with oil said oil cannot pass through said trap and into the pipe leading exteriorly of said tank, and means actuated by said cable exteriorly of the tank for indicating the position of the float in the tank.

5. A tank gauge including a float, an indicator, means actuated by the tank for actuating the indicator, said means including a cable, said indicator including a drum adapted to be rotated by said cable, an auxiliary drum connected with the first mentioned drum, an auxiliary cable wound on the auxiliary drum, a primary weight carried by said auxiliary cable, a secondary weight adapted to rest on the primary weight so that both weights will act on both of said cables for counterbalancing said float, means including graduations for showing the position of the lower end of said primary weight and the relative position of said float in said tank, and manually actuated means for raising and holding said auxiliary weight out of operative contact with said primary weight.

6. In a tank gauge of the character described, a float, a cable actuated by said float, an indicator actuated by said cable, said indicator including a weight for counterbalancing said float to a certain extent, said weight having a flange at the lower end, an auxiliary tubular weight slidingly fitting over the lower end of the primary weight and adapted to rest on said flange, and a manually actuated structure for raising said auxiliary weight and holding the same out of contact with said flange whereby the primary weight may function independently.

7. A tank gauge comprising a float adapted to be positioned in a tank, a cable extending from said float, to a point exteriorly of the tank, and an indicator actuated by said cable, said indicator including a weight adapted to be raised as said cable is pulled in one direction by the float and adapted to move downwardly as the float moves upwardly, an auxiliary weight associated with the first mentioned weight and adapted to coact with the auxiliary weight when in one position to counterbalance to a greater extent said float, and a reciprocating rod adapted to move said auxiliary weight to nonfunctioning position so that said float will be counterbalanced only by the first mentioned weight, thus providing at will two float counterbalancing members, one counterbalancing the float sufficiently to cause the same to float on water and the combined weights counterbalancing the float so that it will float on oil.

RICHARD STAR.